June 7, 1966   J. KAUFMANN   3,255,378
REVERSIBLE COUNTER
Original Filed Sept. 7, 1954   3 Sheets-Sheet 1
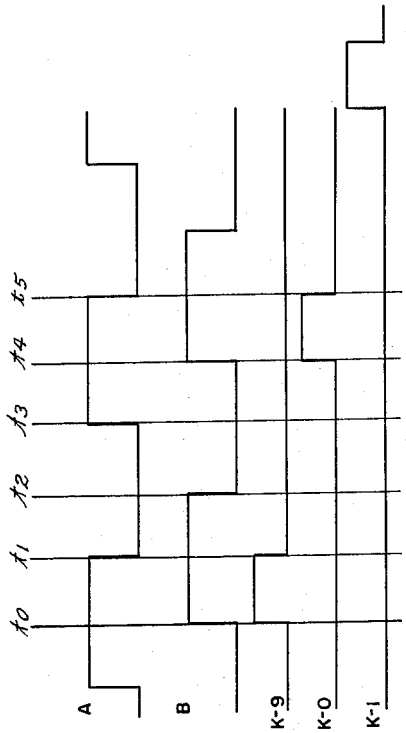
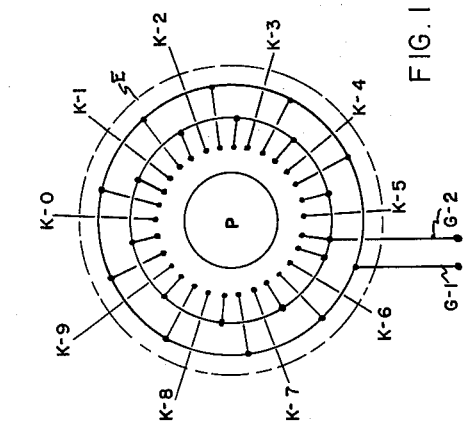
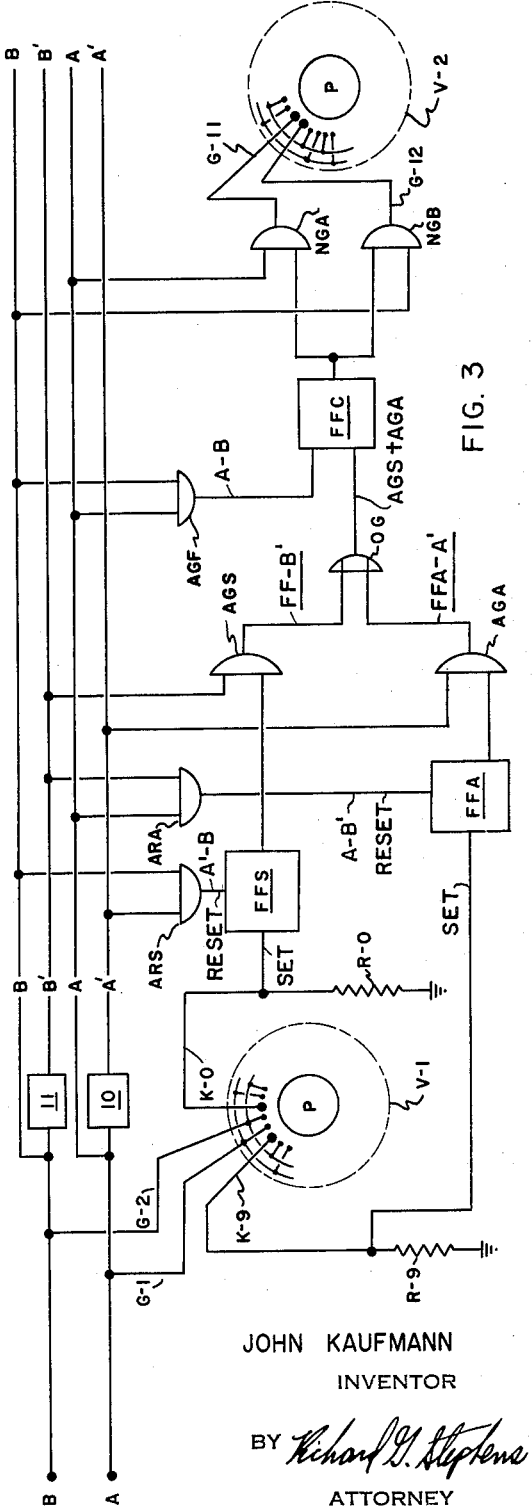
JOHN KAUFMANN
INVENTOR
BY *Richard G. Stephens*
ATTORNEY June 7, 1966  J. KAUFMANN  3,255,378
REVERSIBLE COUNTER
Original Filed Sept. 7, 1954  3 Sheets-Sheet 2
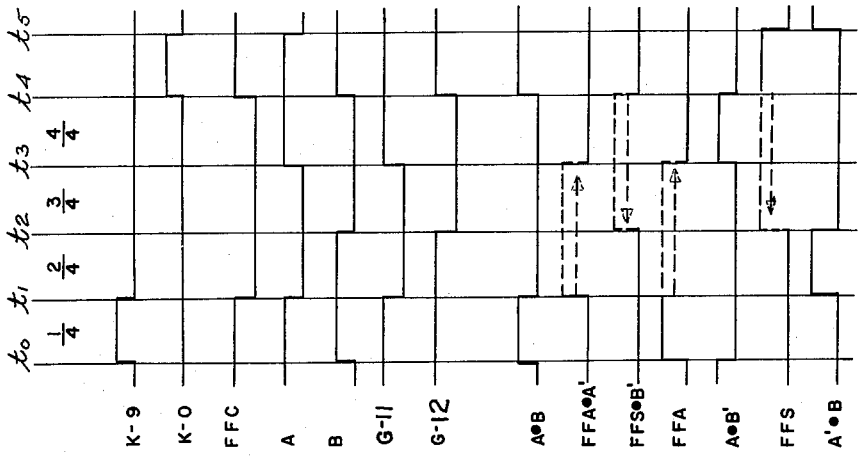
FIG. 4
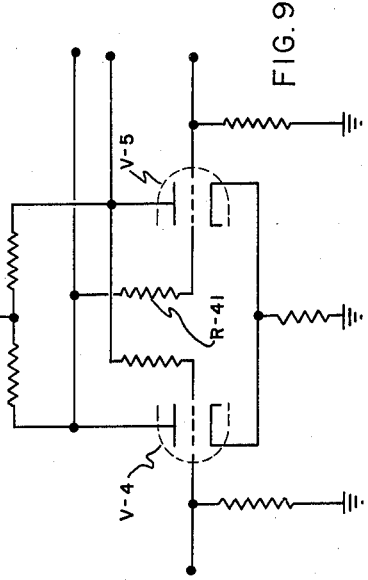
FIG. 9
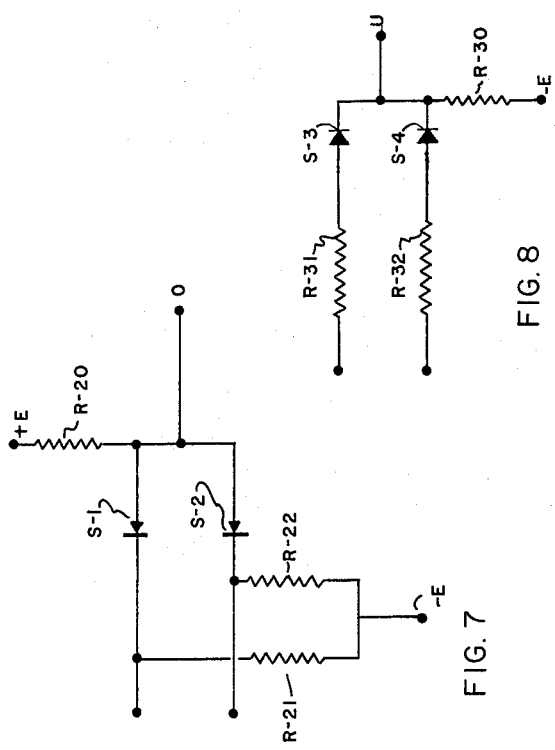
FIG. 8
FIG. 7
JOHN KAUFMANN
INVENTOR
BY *Richard W. Stephens*
ATTORNEY June 7, 1966  J. KAUFMANN  3,255,378
REVERSIBLE COUNTER Original Filed Sept. 7, 1954  3 Sheets-Sheet 3

JOHN KAUFMANN
INVENTOR

BY
ATTORNEY

United States Patent Office 3,255,378
Patented June 7, 1966

3,255,378
REVERSIBLE COUNTER
John Kaufmann, Sunnyvale, Calif., assignor to General Precision, Inc., a corporation of Delaware
Continuation of abandoned application Ser. No. 454,292, Sept. 7, 1954. This application Apr. 12, 1961, Ser. No. 103,683
24 Claims. (Cl. 315—84.6)

My invention relates to high-speed electronic counting circuits, and in particular, to reversible direct-coupled counters having no "backlash" between counting stages. This application is a continuation of United States Patent application Serial No. 454,292, of the same inventor, filed September 7, 1954. In the electrical arts generally, and particularly in the digital computer, automatic control, and instrumentation arts, highspeed electronic counters are often needed to count pulses reversibly. For example, in the interferometric measuring apparatus shown in Patent 2,604,004, granted to Elihu Root, bi-valued pulses out of phase and having a phase sequence in accordance with counting direction are derived from an interferometer, and such pulses are counted to give an absolute length measurement. In order to measure appreciable distances, counters utilizable with such apparatus require a number of decades or stages, and in order that the counter indication always indicate the precise length measured, it is necessary that there be no "backlash" between counting stages. In some respects my invention is an improvement over the invention of "Reversible Counter," by Monson H. Hayes and James L. West, application Serial No. 425,462, filed April 26, 1954, and assigned to the same assignee as the present invention. The Hayes and West invention, as well as the instant invention, utilizes as its basic counting element a cold-cathode, multi-electrode gaseous discharge tube, such as that described in an article "The Dekatron," by Bacon and Pollard, in the May, 1950 issue of Electronic Engineering. In the Hayes and West apparatus, each counting stage after the lowest order stage derives its input potentials from the adjacent lower order stage, and an additional tube per stage is provided to eliminate backlash. The additional counting tubes are set a fraction of a counting cycle out-of-phase with their mates, and hence they may provide an output potential during a "carry" operation to furnish "direction of count" information to the adjacent stage.

Since such counters are not self-setting, the additional tubes may get out of step with their mates, and counting errors may occur. In addition, a relatively complex "zeroing" system is required because the apparatus is not self-setting. Furthermore, since multi-electrode glow transfer tubes are somewhat expensive, it also becomes desirable to replace the additional tube used in each stage with more economical and obtainable apparatus.

It is therefore an object of the invention to provide improved electronic reversible direct-coupled counting apparatus which may be cascaded in stages, and which will have no backlash between stages.

It is another object of the invention to provide improved electronic reversible counting apparatus responsive to input signals phased in accordance with counting direction which has no electrical backlash between counting stages.

It is an additional object of the invention to provide improved reversible, direct-coupled counting apparatus having a carry means operative upon attainment of a base number count in one counting stage to couple the input signals during the entire carry cycle to a similar adjacent stage.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is electrical schematic diagram of a multi-electrode counting device which may be used in practicing my invention;

FIG. 2 is a diagram in which certain potentials utilized in operation of the counting device of FIG. 1 are shown plotted versus time;

FIG. 3 is an electrical schematic diagram of a preferred embodiment of my invention, in which certain conventional portions are shown in symbolic and block diagram form for sake of clarity;

FIG. 4 is a diagram in which certain potentials appearing in the apparatus of FIG. 3 are shown plotted against a reversible time axis;

FIG. 7 is an electrical schematic diagram of a conventional "and" gate for positive pulses which may be used for the "and" gates for positive pulses shown symbolically in FIGS. 3 and 5;

FIG. 8 is an electrical schematic diagram of a conventional "or" gate for posiitve pulses which may be used for the positive "or" gates and the "and" gates for negative pulses shown in FIGS. 3 and 5;

FIG. 9 is an electrical schematic diagram of a conventional Eccles-Jordan flip-flop which may be used for several bi-stable devices shown symbolically in FIGS. 3 and 5.

Figure 6:
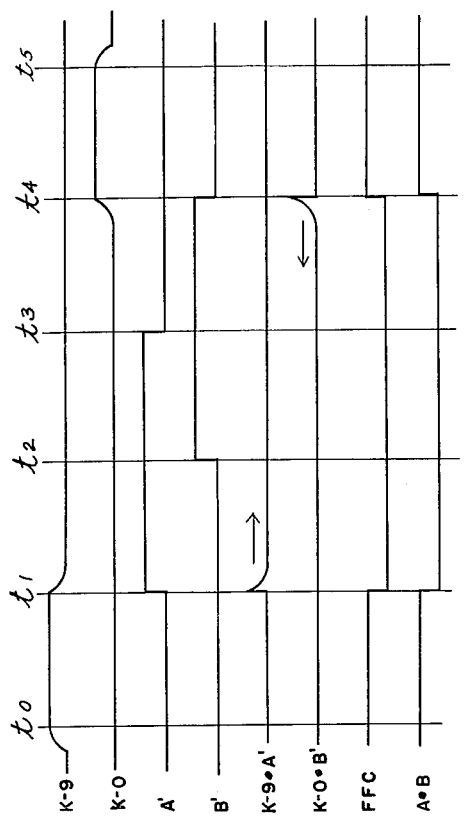
FIG. 6 is a diagram in which certain potentials appearing the apparatus of FIG. 5 are shown plotted against a reversible time axis.

In FIGS. 2, 4 and 6, potentials are not plotted to scale, since all potentials considered are bi-valued, i.e., either high or low.

Referring to FIG. 1 there is shown schematically a cold-cathode gaseous discharge valve having a total of 31 elements. Ten of these elements are referred to for convenience as "cathodes," and are identified in FIG. 1 by the symbols K–0 to K–9. The ten "cathodes" are arranged equidistantly in circular array about a disc-shaped anode P within a gas filled envelope E, and terminals for external connections are brought out of the envelope.

Situated between each adjacent pair of cathodes are two similar elements which may be referred to four convenience as "guides." Those guides located immediately clockwise from their respective cathodes are all interconnected by a guide rail having an external terminal G–1 and may be referred to collectively as "guide set one." Those guides disposed immediately clockwise from the G–1 guides are all interconnected by a guide rail having an external terminal G–2 and may be referred to collectively as "guide set two."

If a voltage in excess of the ionization potential is applied between the anode P and a given cathode, a gaseous glow discharge will be established between the anode P and the particular cathode. Assume that anode P in FIG. 1 is connected to a source of positive constant direct voltage and that a voltage sufficiently negative with respect thereto is applied to cathode K–1, so that a glow discharge exists between anode P and cathode K–1. Now, if a more negative voltage than that on cathode K–1 is applied to terminal G–1, the terminal of guide set one, the glow may become established from anode P to the adjacent guide of guide set one and will no longer exist between cathode K–1 and anode P. It will be appreciated that the glow will transfer more readily one position clockwise than two positions counterclockwise. Resistances may be inserted in the cathode and guide circuits so that anode current is limited at any one time to one cathode, to one guide or two guides, but never to a guide and a cathode. Thus it will be seen that the glow has been translated clockwise. If next the potential of guide set two is made as negative as that of guide set one, the glow will become established between anode P and both the G–1 and G–2 guides immediately clockwise of cathode K–1. Now, if the potential of guide set one is made more positive, the glow to guide one will be extinguished, and a glow will exist between anode P and guide two only. Finally, if the potential of both guide sets is made less negative, the glow will be transferred clockwise to adjacent cathode K–2. Thus it may be seen that a transfer from one cathode to an adjacent cathode, or a "count of one" has been made.

By arbitrarily numbering the count successively from 0 to 9 in a given direction the count will progress in an additive manner if the glow is transferred in that direction. With a resistance inserted in each cathode circuit, the cathode potential may be sampled to sense electrically the position of the glow discharge, since the voltage on a particular cathode will rise as the glow is directed toward it. By viewing the top or face of the tube one may observe the position of the glow discharge, and by placing numerals on or adjacent the tube, a visual indication of the count may be provided.

If, in the single counting cycle described above, the order of lowering (making more negative) of the guide set potentials were reversed, so that guide set two potentials were lowered before guide set one potentials, the discharge would have been transferred in an opposite, or counterclockwise direction, going from cathode K–1 to guide set two situated immediately counterclockwise from cathode K–1, and then progressing through the remainder of the similar but reversed counting cycle to be transferred ultimately to cathode K–0.

It may be noted that a single complete counting cycle (transfer from a given cathode to an adjacent cathode) is comprised of four distinct states. The voltages applied to lower and raise the potentials of the guide sets vary the direction of counting according to their order of application, and since they are applied in four different stages per unit count, it may be seen that reversing the count (addition to subtraction, or vice versa) may be done at any quarter of the counting cycle. In other words, a pair of sequential overlapping negative voltage pulses which we may designate $a$ and $b$ applied to guide sets 1 and 2 respectively are required to transfer the discharge. When in the order $ab$, a unit is added to the count; when in the order $ba$ a unit is subtracted from the count.

Referring to FIG. 2 there is shown a diagram illustrating graphically the condition of the potentials on the guides during each quarter of two complete clockwise counting cycles. The potential with respect to ground of guide set one is illustrated by line A, and the potential of guide set two is described by line B. The broken vertical lines numbered $t_0$ through $t_5$ are time references for the pulse occurrences and are consistent with the time references used in FIG. 4, the latter being a complete pulse-time description of the embodiment of FIG. 3. Each cathode may be connected to ground through a resistance. It will be seen that the voltages represented by lines A and B are 90 degrees out of phase, with potential A leading by ¼ cycle. It will be apparent to those skilled in the art that pairs of voltages phased 90 degrees apart in accordance with direction are commonly produced as outputs from numerous electrical and electronic devices, and that such voltages may be "squared" by conventional trigger circuits.

As voltages such as those shown graphically in FIG. 2 are applied to the guide sets, the count will progress continuously around the tube by repetition of the counting cycle. Since the electrodes are spaced symmetrically in circular array about the anode, their numerical designation may be entirely arbitrary. Therefore, no special provision need be made for translating from K–9 to K–0, or from K–0 to K–9, such as would be necessary in prior art counting tubes in which the elements are arranged in straight-line fashion.

In most counting or translating problems it is necessary that counts be made of many more than ten pulses, as mentioned above, and hence it becomes desirable to provide succeeding higher order decades or stages so that counts of tens, hundreds, thousands, ten-thousands, etc. may be made. Also shown in FIG. 2 are the cathode potentials of the counting tube with respect to ground for two complete clockwise counting cycles from a count of "nine" to a count of "one" which may be called a "carry" cycle. As may be seen in FIG. 2, the signals derived from the respective cathodes occur during the first quarter of an additive carry cycle and during the last quarter of a substractive, or reversed counting cycle. This will introduce three-quarters of a counting cycle of backlash between counting stages. The invention eliminates such backlash by provision of novel "carry" circuits which "gate" the original 90°-phased bi-valued signals to all higher order stages, so that all stages are responsive to the original signals and hence may be free from backlash. In order that no backlash occur, it is necessary that the gates apply the original signals to the higher order decades throughout the entire "carry" period regardless of counting direction, and the provision of such gating in a reversible, direct-coupled counter is a salient feature of my invention.

Referring to FIG. 3 there is shown an electrical schematic of a counter constructed according to my invention in which certain conventional parts are shown in block form for sake of clarity. Input potentials such as those shown in FIG. 2 are applied to terminals A and B to translate the glow discharge in counting tube V–1 in the manner described above. The single complete counting stage shown counts such input pulses and properly gates the pulses during a "carry" operation to the counting tube V–2 of a second order counting stage which may be identical to the first order or "units" stage shown. It will become apparent as the description proceeds that additional stages may be cascaded at will, with each stage serving to gate the input pulses to the guide electrodes of the counting tube of its adjacent higher order stage at proper intervals.

As may be seen in FIG. 3, the input signals A and B are also applied to phase or polarity inversion means 10 and 11, each of which may comprise, for example, an ordinary direct-coupled amplifier, to provide signals A' and B', which are the inverse of potentials A and B, respectively. Potentials A, A', B and B' are thereby made available for operating all the succeeding stages of a multistage counter. It will become apparent that in the "decade" or "ten" counter shown, that the second stage counting tube V–2 should be translated additively one cathode position each time the glow in tube V–1 passes from K–9 to K–0 for an additive count, and that V–2 should be translated subtractively one cathode position each time the glow in tube V–1 passes from K–0 to K–9 for subtractive or reversed counting. In order to translate tube V–2, signals A and B are gated to its guide electrodes G–11 and G–12 through negative "and" gates NGA and NGB, respectively. Gates NGA and NGB, which will be described in greater detail below, each produce a negative output voltage when both of the input voltages to a gate are low. One of the input voltages to each of negative "and" gates NGA and NGB is supplied from a bi-stable device FFC termed the "carry flip-flop," which may comprise a conventional Eccles-Jordan flip-flop. Hence whenever the output voltage from FFC is low or negative, negative input signals at A and B will be applied to the guide electrodes of counting tube V–2, causing tube V–2 to translate.

Shown graphically versus time in FIG. 4 are characteristic waveforms at various points in the apparatus during a count proceeding from "nine" to "ten" or "ten" to "nine." As in FIG. 2, potentials are shown symbolically and not to scale. The time axis of FIG. 4 is reversible, however, so that left-to-right represents adding counting, and right-to-left represents subtracting counting. It may be seen that the output voltage from "carry flip-flop" FFC is low or negative during three-quarters of a counting cycle (from $t_1$ to $t_4$), during which time input voltages A and B are gated to counting tube V–2 as explained above. Since counting tube V–2 of the second stage is under complete control of the input signals A and B during this time, there will be no electrical "backlash" between counting stages, and thus the counter may be reversed at any time without ambiguity of count occurring.

The means I have utilized to actuate the carry flip-flop FFC are also shown symbolically in FIG. 3. The rectangles labelled FFA and FFS are each bi-stable devices (as, for example, dual-triode flip-flops) having the property of being "set" by a high or positive potential applied to one input and "reset" by a high or positive potential on the other input. The bi-stable device is said to be "set" when its output potential is high or positive, and "reset" when its output potential is low or negative. FFA, which may be designated as the "adding flip-flop," is "set" by a positive signal applied from cathode K–9 of tube V–1. This will occur whenever the glow in tube V–1 arrives at cathode K–9. The output potential of FFA is shown in FIG. 4. If the count is progressing additively, the output potential of FFA will remain high or positive from time $t_0$ to time $t_3$. That portion of the potential plot shown in dashed lines accompanied by the dashed arrow applies to additive counting only. At time $t_3$, flip-flop FFA will be reset by potential A.B', which is shown in FIG. 4, and which is derived by applying potentials A and B' to a positive "and" gate ARA, which will be described later in greater detail. If counting direction is reversed during the carry cycle, FFA will be "reset" at time $t_0$ by potential A.B'. FFS, which may be termed the "subtracting flip-flop," is "set" by a positive voltage appearing on cathode K–0 of tube V–1. This will occur whenever the glow discharge in tube V–1 reaches cathode K–0 of tube V–1. The output potential of FFS is illustrated similarly in FIG. 4, and it may be seen that FFS will remain "set" between time $t_5$ and $t_2$ only when the count is subtracting, as indicated by the right-to-left dashed arrow. FFS is reset by potential A'.B at time $t_2$, which is illustrated graphically in FIG. 4, and which is derived as shown in FIG. 3 by applying potentials A' and B to a positive "and" gate ARS. If counting direction is reversed during the carry cycle, FFS will be "reset" at time $t_5$ by potential A'.B.

The output potential of adding flip-flop FFA is applied together with inverse input potential A' to positive "and" gate AGA, which produces an output potential shown as FFA.A' in FIG. 4 as the count progresses additively. The output potential of subtracting flip-flop FFS is applied together with inverse input potential B' to positive "and" gate AGS, which produces an output potential shown as FFS.B' in FIG. 4 as the count progresses subtractively. Potentials FFA.A' and FFS.B' are applied as inputs to a positive "or" gate OG, and hence the presence of either potential will serve to "reset" carry flip-flop FFC during the carrying period $t_1$ to $t_4$. During additive counting carry flip-flop FFC will be "reset" at time $t_1$ due to the signal from "and" gate AGA, and being bi-stable, the flip-flop will remain "reset" until "set" at time $t_4$ by potential A.B, which is the opposite input to carry flip-flop FFC. During subtractive counting, carry flip-flop FFC will be "reset" at time $t_4$ due to the signal from "and" gate AGS, and will remain "reset" until "set" at time $t_1$ by potential A.B. "Setting" potential A.B shown graphically in FIG. 4 is derived as shown in FIG. 3 by applying input signals A and B to a positive "and" gate AGF. Hence it may be seen that carry flip-flop FFC is "reset" as required during the carrying period ($t_1$ to $t_4$), enabling negative "and" gates NGA and NGB to apply input signals A and B to guide electrodes G–11 and G–12 of the counting tube of the adjacent stage.

Figure 5:
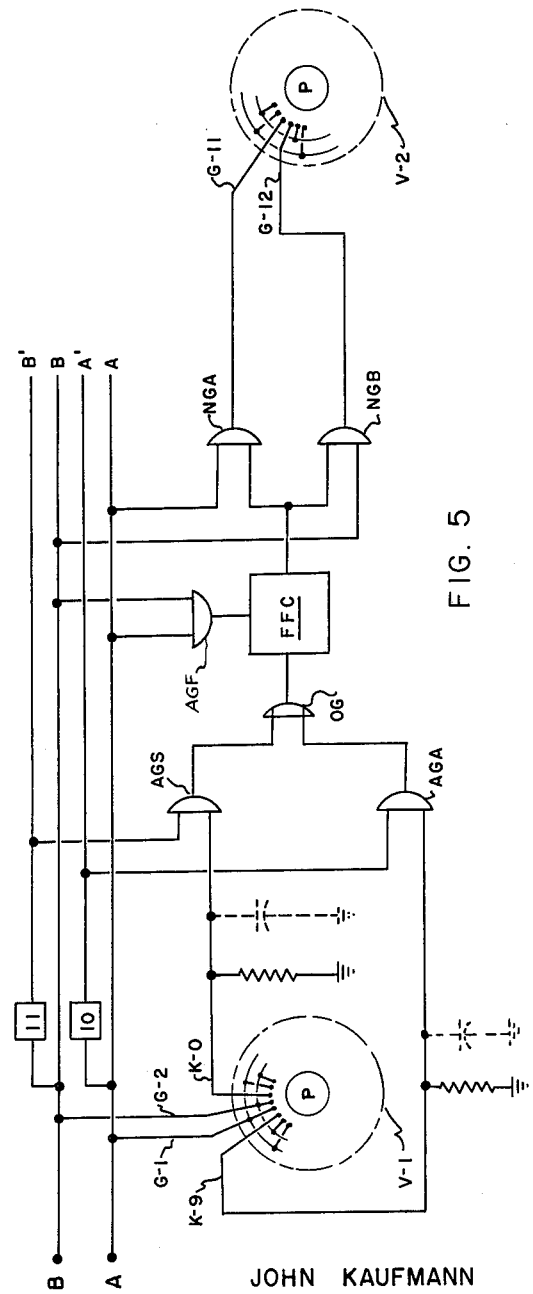
FIG. 5 is an electrical schematic diagram of an alternative embodiment of my invention shown partially in symbolic and block diagram form.

Referring to FIG. 5 there is shown symbolically an alternative embodiment of my invention connected so as to eliminate the need for adding and subtracting flip-flops. Parts similar to those of FIG. 3 carry similar designations. In FIG. 5 the output potential of cathode K–9 counting tube V–1 is gated through positive "and" gate AGA with A' to "reset" carry flip-flop FFC at time $t_1$ for additive counting, and the output potential of cathode K–0 of counting tube V–1 is gated through positive "and" gate AGS with B' to "reset" carry flip-flop FFC at time $t_4$ for subtractive counting. For such operation it is necessary that input potentials A and B change rapidly with respect to counting tube cathode electrode potentials, and hence it is desirable that the input signal potentials used with this embodiment of the invention be derived by means of rapidly acting circuits, such as the well-known Schmitt trigger circuit. The operation may be made more reliable by the addition of a small capacitor at each of the K–0 and K–9 cathode electrodes as shown in dashed lines in FIG. 5. Characteristic waveforms for the alternative embodiment are shown in FIG. 6. It will be seen that the output potentials from "and" gates AGA and AGS consist of spikes which are used to "reset" carry flip-flop FFC. Thus, the lag in voltage change as the glow is transferred away from a cathode electrode during the start of a carry period ($t_1$ to $t_4$) supplies a potential having a location and presence which indicates the start of a carry period in a particular counting direction. In FIG. 3, the adding and subtracting flip-flops FFA and FFS serve similarly as "memory" elements after the glow leaves the K–9 and K–0 cathodes to indicate that "carrying" in a particular direction should take place.

Shown schematically in FIG. 7 is an example of a well-known positive "and" gate which may be utilized as "and" gates ARS, ARA, AGS, AGA and AGF of the invention. With no input potentials applied to terminals 20 and 21 of the gate, current flows from the positive supply terminal and resistance R–20 through rectifiers S–1 and S–2 and resistors R–21 and R–22 to the negative supply terminal. By proper selection of resistances and supply voltages it is apparent that the output potential at terminal 0 may then remain near ground potential. As a positive input potential is applied to one input terminal, output terminal 0 remains at ground potential since the other rectifier-resistance circuit remains unaffected. However, as positive input pulses are applied to both input terminals, both diodes will be cut off, and output terminal 0 will rise in a positive manner. It will be apparent to those skilled in the art that rectifiers S–1 and S–2 may comprise vacuum diodes, germanium diodes or other known rectifying devices.

Shown schematically in FIG. 8 is an example of a well-known negative "and" gate which may be utilized as gates NGA and NGB of my invention, and which may also be used as positive "or" gate OG of my invention. With no signal inputs, current flows though rectifiers S–3 and S–4 and through R–30 to the negative supply terminal. By proper selection of resistances and supply voltages, output terminal U will remain at or near ground potential. Application of a positive potential to either input terminal will apply a current through its associated rectifier to develop a positive output at terminal U. Application of a negative potential to one input terminal will not affect the output potential due to the current flow through the other rectifier, but application of negative potentials to both input terminals will cut off both diodes and then drive output terminal U negative.

Shown schematically in FIG. 9 is a conventional Eccles-Jordan flip-flop which may be used as FFA, FFS and FFC of my invention. A positive input pulse on input terminal 40 drives triode V-4 to saturation, decreasing the plate voltage of V-4. The decrease in plate voltage is coupled through resistor R-41 to the grid of V-5, driving triode V-5 to cutoff. Connection of both triodes through a common cathode resistor makes transition occur rapidly. The flip-flop remains as described until a positive voltage is applied to the gride of triode V-5. As triode V-5 is driven to saturation, its decrease in plate voltage cuts off triode V-4. The flip-flop output voltages, which are the inverse of each other, are taken from the triode plates. Only one output voltage from each flip-flop is needed, however. In adding flip-flop FFA, triode V-4 receives its input from cathode K-9, triode V-5 receives its input from "and" gate ARA, and FFA output is taken from the plate of triode V-5. In subtracting flip-flop FFS, triode V-4 receives its input from cathode K-0, triode V-5 receives its input from "and" gate ARS, and FFS output is taken from the plate of triode V-5. In carry flip-flop FFC, triode V-4 receives its grid input from "or" gate OG, triode V-5 receives its input from "and" gate AGF, and FFC output is taken from the plate of triode V-4.

An important advantage of my invention is that resetting all the stages of a multi-stage counter to "zero" may be done simply by forcing applied input signals A and B to be high and momentarily lowering the potential of the K-0 cathodes of all stages. The Hayes and West counter mentioned above requires a relatively complex "zeroing" procedure in order to place the counting tube pair of each stage correctly out-of-phase.

It will be apparent to those skilled in the art that additional indicating means may be connected to counters constructed according to my invention in the same manner as shown in the Hayes and West application. It will also be apparent that while I have illustrated my invention as applied to decade counting stages, that it is as well applicable to counters having other numbers of "cathode" electrodes for use in counting according to other base numbers. Furthermore, while I have shown my invention using glow transfer tubes operating at four distinct states per counting cycle, it will be apparent to those skilled in the art that my invention may also be used in counters using other numbers of states per counting cycle.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Reversible direct-coupled counting apparatus comprising a counting device having a current source, a plurality of electrodes and translating means having two input lines responsive to input signals for applying current successively to each of said electrodes, means connected to a pair of said electrodes for deriving carry signals during the beginning of a carry cycle in either direction, and gating means responsive to said carry signals and said input signals for applying said input signals to similar translating means of a similar adjacent higher order counting stage, said gating means comprising a bi-stable flip-flop connected to said two input lines of said similar translating means through first and second "and" gates, said "and" gates each also being connected to one of said signal input lines to provide an output signal upon simultaneous receipt of an input signal and a signal from said flip-flop, said flip-flop having two input lines, one of said flip-flop input lines being connected to a third "and" gate responsive to both of said signal input lines and the other of said flip-flop input lines being connected to the output terminal of an "or" gate having two input lines, each of said "or" gate input lines being connected by means of a further "and" gate to be actuated upon simultaneous occurrence of absence of an input signal on an individual one of said signal input lines and translation of said current to an individual one of said pair of electrodes.

2. Reversible direct-coupled counting apparatus comprising a counting device having a current source, a plurality of numbered electrodes and translating means responsive to both lagging and leading phased input signals for applying current successively to each of said electrodes; means connected to an adjacent pair of said electrodes for deriving carry cycle signals as said current is translated from one electrode toward the other electrode of said pair; gating means responsive to said carry cycle signals and to said input signals; bi-stable means connected to the output of said gating means to produce a first potential as said current is translated between said pair of electrodes and to produce a second potential at all other times, said means responsive to said carry cycle signals including bi-stable means; and a pair of gates responsive to said first and second potentials and said input signals for applying said input signals to the translating means of a similar counting device upon occurrence of said first potential.

3. Reversible direct-coupled counting apparatus having no backlash between counting stages comprising a first counting device having a multi-electrode gaseous discharge transfer tube repsonsive to a pair of phased input signals on a pair of input lines for bi-directionally translating tube current successively to each of a base number of electrodes, gating means connected to the zero electrode and base number electrode and thereby responsive to receipt of current upon said zero or base number electrode for deriving a potential as said current is translated away from said zero electrode toward said base number electrode or away from said base number electrode toward said zero electrode, said means connected to the zero electrode and base number electrode including bi-stable means, and a pair of "and" gates each responsive to said potential and to occurrence of an input signal on an individual one of said input lines for applying input signals to the transfer tube of a similar adjacent higher order counting stage, whereby said higher order counting stage will be actuated during a carry cycle.

4. Reversible counting apparatus comprising a plurality of counting stages, each counting stage comprising a multi-electrode glow transfer tube having a source of current, a plurality of electrodes arranged in circular array and translating means responsive to bi-valued input signals phased in accordance with counting direction for translating current from said source successively to each of said electrodes, said plurality of electrodes including a zero electrode and a base number electrode, a first bi-stable flip-flop responsive to the potential of said zero electrode and to said input signals for deriving a second potential as said current is translated away from said zero electrode toward said base number electrode, a second bi-stable flip-flop responsive to the potential of said base number electrode and to said input signals for deriving a fourth potential as said current is translated away from said base number electrode toward said zero electrode, and gating means responsive to said second and fourth potentials for applying said input signals to similar translating means of the adjacent higher order counting stage for the time during which said current is being translated between said zero and base number electrodes.

5. Reversible counting apparatus comprising a counting device having a current source, a base number of electrodes and translating means responsive to input signals phased in accordance with counting direction for translating current successively to said electrodes, memory means connected to each of an adjacent pair of said electrodes for receiving potentials as said current is applied to either of said electrodes and for providing temporary potential at its associated electrode when said current is translated away from said associated electrode, a pair of inverting devices connected to be operated by said input signals, first and second "and" gates responsive to the potentials at said electrodes of said adjacent pair and to the output potentials from said inverting devices, an "or" gate, the output signals from said "and" gates being connected to operate said "or" gate, a bi-stable flip-flop responsive to said "or" gate and to said input signals for providing a gating pulse, and a further pair of "and" gates each connected to one of said input signals and operable upon simultaneous receipt of an input signal and said gating pulse to apply an output voltage to similar translating means of an identical adjacent higher order counting stage.

6. Direct-coupled reversible counting apparatus comprising a first counting device having a plurality of numbered electrodes, current translating means responsive to bi-valued input signals phased in accordance with counting direction for translating a current successively to said numbered electrodes, gating means, means connecting an adjacent pair of said electrodes to said gating means to actuate said gating means upon translation of said current to either of said pair of electrodes and to disable said gating means upon subsequent translation of said current to the other electrode of said pair, said gating means being operable upon actuation to apply said input signals to a second similar counting device.

7. Reversible counting apparatus comprising a plurality of counting stages, each counting stage comprising a multi-electrode glow transfer tube having a source of current, a plurality of electrodes arranged in substantially circular array, and translating means responsive to bi-valued input signals phased in accordance with counting directions for translating current from said source successively to each of said electrodes, said plurality of electrodes including a zero electrode and a base number electrode, a first gating means responsive to the potential of said zero electrode and to a first one of said input signals for deriving a potential as said current is translated away from said zero electrode toward said base number electrode, a second gating means responsive to the potential of said base number electrode and to a second one of said input signals for deriving a potential as said current is translated away from said base number electrode toward said zero electrode, and third gating means responsive to the potentials derived by said first and second gating means for applying input signals to similar translating means of the adjacent higher order counting stage.

8. Direct-coupled reversible counting apparatus comprising a first counting device having a plurality of numbered electrodes, current translating means responsive to bi-valued input signals phased in accordance with counting direction for translating a current successively to said electrodes gating means, circuit means connecting an adjacent pair of said electrodes to said gating means to actuate said gating means upon translation of said current to either of said pair of electrodes, said gating means being operable upon actuation to apply input signals to a second similar counting device.

9. Direct-coupled reversible counting apparatus comprising a first counting device having a plurality of numbered electrodes, current translating means responsive to bi-valued input signals phased in accordance with counting direction for translating a current successively to said electrodes gating means, circuit means responsive to said input signals and to current in one of an adjacent pair of said electrodes to apply input signals to said gating means upon translation of said current to either of said pair of electrodes, said gating means being operable upon actuation to apply input signals to a second similar counting device.

10. Direct-coupled reversible counting apparatus comprising a first counting device having a plurality of numbered electrodes, current translating means responsive to bi-valued input signals phased in accordance with counting direction for translating a current successively to said electrodes, first, second and third gating means, said first and second gating means connecting an adjacent pair of said electrodes to said third gating means to apply input signals to said third gating means upon translation of said current to either of said pair of electrodes, said third gating means being operable upon actuation to apply input signals to a second similar counting device.

11. Direct-coupled reversible counting apparatus comprising a first counting device having a plurality of numbered electrodes, current translating means responsive to bi-valued input signals phased in accordance with counting direction for translating a current successively to said electrodes, first, second and third gating means, said first and second gating means responsive respectively to one of said input signals and to current in one of an adjacent pair of said electrodes to apply input signals to said third gating means upon translation of said current to either of said pair of electrodes, said third gating means being operable upon actuation to apply input signals to a second similar counting device.

12. A reversible decade counter having a plurality of decade stages each of which includes a gas flow-switching tube of the type having a first and a second guide terminal the advance or regression of a count being obtained by the order of application of a first and second pulse respectively to said first and second guide terminals, means for applying a first and second pulse to a first of said plurality of decades, means for coupling all the second guide terminals of all decades together, interstage coupling means between decades each including means for applying a first pulse to the first guide terminal of a succeeding decade prior to a second pulse to the second guide terminal of said succeeding decade responsive to a preceding decade being in its ninth count condition and the application thereto of a first pulse followed by a second pulse, and means for applying a first pulse to the first guide terminal of said succeeding decade subsequent to a second pulse to the second guide terminal of said succeeding decade responsive to said preceding decade being in its zero count condition and the application thereto of a second pulse followed by a first pulse.

13. A reversible decade counter having a plurality of decade stages each of which includes a gas glow-switching tube of the type having a first and a second guide terminal, the advance or regression of a count being obtained by the order of application of a first and second pulse respectively to said first and second guide terminals, means for applying first and second pulses to a first decade, means for coupling all said second guide terminals together, a coupling arrangement between decades including a flip-flop circuit having a first and second stable state, a first means for driving said flip-flop from its first to its second stable state responsive to said first decade being in its ninth count condition and the application thereto of a first pulse preceding a second pulse, a second means for driving said flip-flop from its first to its second stable state responsive to said first decade being in its zero condition and the application thereto of a second pulse preceding a first pulse, means to apply output from said flip-flop in its second stable state to the first guide terminal of a decade succeeding said first decade, and means responsive to the application of a first pulse or a second pulse to said first decade to reset said flip-flop.

14. In a device of the class described, a first multicathode gaseous-discharge tube, having output electrodes, pulse means to cycle a discharge around said tube in either direction, control means for deriving a control pulse whenever said discharge reaches an output electrode of said tube, a second multicathode gaseous-discharge tube, transfer means connected directly with said pulse means and with said control means, said transfer means being effective to cycle said second discharge around said second tube in response to said control pulse and said pulse means in a direction corresponding to the direction of discharge transfer in said first tube.

15. In a device of the class described, a first multicathode gaseous-discharge tube having output electrodes, a pulse means to cycle a discharge around said tube in either direction, a second multicathode gaseous-discharge tube, means for deriving a control pulse whenever said discharge reaches an output electrode of said tube, a positive gate circuit and a negative gate circuit interconnected with said output electrodes and responsive to the direction of transfer of the discharge in said first tube whereby one or the other of said gate circuits will be operative in response to said direction, said operative gate being effective to transfer the discharge in said second tube in response to said control pulse and in a direction corresponding to the direction of transfer in said first tube, and means connected with said pulse means and gate circuits for applying control signals to said gate circuits to control the conduction thereof.

16. In a device of the class described, a first multicathode gaseous-discharge tube having output electrodes, pulse means to transfer said discharge from cathode to cathode around said tube in either direction, a second multicathode gaseous-discharge tube, means for transferring a discharge from cathode to cathode around said second tube in either direction, means for deriving a control pulse from said first tube whenever said discharge completes a cycle and reaches an output electrode of said tube, a positive gate circuit, a negative gate circuit, said gate circuits being interconnected with the input to said second tube and alternatively actuated in response to the direction of transfer in said first tube, said operative gate circuit being responsive to said control pulse for transferring the discharge in said second tube to an adjacent cathode and in a direction corresponding to the direction of transfer in the first tube, and means connected with said pulse means and gate circuits for applying control signals to said gate circuits to control the conduction thereof.

17. In a device of the class described, a first multicathode discharge tube having a pair of output electrodes, pulse means to cycle a discharge around said tube in either direction, a second multicathode discharge tube having control electrodes, means for deriving a control pulse whenever said discharge reaches one of said pair of output electrodes of said first tube, a positive gate circuit and a negative gate circuit connected with said output electrodes and with the control electrodes of said second tube, and control means connected with said pulse means and said gate circuits for controlling the conduction of said gate circuits in response to the voltage wave form of said pulse means.

18. The circuit according to claim 17 wherein the control means comprises a third multicathode discharge tube.

19. In a device of the class described, a first multicathode discharge tube having a pair of output electrodes, pulse means to cycle a discharge around said tube in either direction, a second multicathode discharge tube having control electrodes, means for deriving a control pulse whenever said discharge reaches one of said pair of output electrodes of said first tube, positive and negative gate means connected with said output electrodes and with the control electrodes of said second tube, and control means operated by said pulse means for controlling the conduction of said gate means.

20. In a device of the class described, a first multicathode discharge tube having a pair of output electrodes, pulse means to cycle a discharge around said tube in either direction, a second multicathode discharge tube having control electrodes, positive and negative gate means connecting the output electrodes of said first discharge tube with the control electrodes of said second discharge tube, and means for controlling the conduction of said gate means in accordance with the output of said pulse means.

21. In a device of the class described, a first multicathode discharge tube having a pair of output electrodes, pulse means to cycle a discharge around said tube in either direction, means for deriving a control pulse whenever said discharge reaches one of said pair of output electrodes of said first tube, a second multicathode discharge tube having control electrodes, and means including positive and negative gate means operated by said pulse means for controlling a path for transferring said control pulse to the control electrodes of said second multicathode discharge tube.

22. In a device of the class described, a first multicathode discharge tube having a pair of output electrodes, pulse means to cycle a discharge around said tube in either direction, means for deriving a control pulse whenever said discharge reaches one of said pair of output electrodes of said first tube, a second multicathode discharge tube having control electrodes, and controllable transfer means controlled by said pulse means for transferring said control pulse to the control electrodes of said second discharge tube.

23. A reversible multistage electronic counter for operation by pairs of sequential overlapping voltage pulses $a$ and $b$ in either order, each pair in the order $ab$ representing a unit to be added to the count and in the order $ba$ representing a unit to be subtracted from the count, including for each numerical power required a glow-discharge counter tube of the kind having a circular array of digit-representing cathodes surrounding a common anode, each pair of adjacent cathodes having between them and individual to them first and second electrodes spaced in that order in the direction of increasing count, each tube having first and second guide-rails common to all the cathodes of the tube and connected to all the first electrodes and to all the second electrodes of the tube respectively, means for applying in a negative-going sense each $a$ pulse to the first rails of all the tubes simultaneously, and each $b$ pulse to the second rails of all the tubes simultaneously, and for each tube, except that for the highest power, inhibiting means, operative when the discharge of the tube is directed to any of the digit cathodes of the tube which represent digits other than zero, to inhibit the counting action of the tube of each higher power whilst the glow remains directed to that cathode.

24. A counter as claimed in claim 23 wherein each cathode representing a zero digit is connected to a switching circuit operable at will to carry the potential of said cathode sufficiently negative to attract to that cathode the glow discharge of the tube.

References Cited by the Examiner

UNITED STATES PATENTS

| | | | |
|---|---|---|---|
| 2,462,292 | 2/1949 | Snyder | 235—92 |
| 2,473,159 | 6/1949 | Lyman | 315—84.6 |
| 2,481,347 | 9/1949 | Riggen | 235—92 |
| 2,591,008 | 4/1952 | Rench | 235—92 |
| 2,604,004 | 7/1954 | Root | 235—92 |

GEORGE N. WESTBY, *Primary Examiner.*

RALPH G. NILSON, ARTHUR GAUSS, *Examiners.*